United States Patent
Levesque

(10) Patent No.: US 10,380,851 B2
(45) Date of Patent: Aug. 13, 2019

(54) HAPTIC EFFECTS CONFLICT AVOIDANCE

(71) Applicant: IMMERSION CORPORATION, San Jose, CA (US)

(72) Inventor: Vincent Levesque, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 16/159,563

(22) Filed: Oct. 12, 2018

(65) Prior Publication Data

US 2019/0066461 A1 Feb. 28, 2019

Related U.S. Application Data

(63) Continuation of application No. 15/841,227, filed on Dec. 13, 2017, now Pat. No. 10,102,726, which is a continuation of application No. 15/049,745, filed on Feb. 22, 2016, now Pat. No. 9,881,467.

(51) Int. Cl.
*G08B 6/00* (2006.01)
*G06F 3/01* (2006.01)
*H04M 1/725* (2006.01)

(52) U.S. Cl.
CPC ............ *G08B 6/00* (2013.01); *G06F 3/016* (2013.01); *H04M 1/72569* (2013.01)

(58) Field of Classification Search
CPC .................. G08B 6/00; G06F 3/016
USPC ...................................... 340/407.1
See application file for complete search history.

(56) References Cited

U.S. PATENT DOCUMENTS

| | | | |
|---|---|---|---|
| 2,701,037 | A | 2/1955 | Lyon |
| 4,664,335 | A | 5/1987 | Kohlen |
| 4,831,365 | A | 5/1989 | Thomas et al. |
| 6,751,534 | B2 | 6/2004 | Robichaux et al. |
| 7,245,231 | B2 | 7/2007 | Kiefer et al. |
| 7,411,485 | B2 | 8/2008 | Jarlengrip |

(Continued)

FOREIGN PATENT DOCUMENTS

| | | |
|---|---|---|
| EP | 2763000 | 8/2014 |
| EP | 2 778 850 | 9/2014 |

(Continued)

OTHER PUBLICATIONS

Precision Microdrives, "Torque Wrench/Gauge Tactile/Haptic (vibration) Feedback," http://www.precisionmicrodrives.com/application-notes-technical-guides/torque-wrench-haptic-vibration-feedback, last downloaded Sep. 15, 2015.

(Continued)

*Primary Examiner* — Eric Blount
(74) *Attorney, Agent, or Firm* — Medler Ferro Woodhouse & Mills PLLC

(57) ABSTRACT

A method and system for avoiding haptic effects conflict is presented. A haptic enabled device configured to generate haptic effects associated with a first signature is used by a user. The system detects an additional source of haptic effects and determines a second signature associated with the haptic effects produced by the source. The system determines a preferred set of haptic configurations and modifies either the first or second signature based on the preferred set of haptic configurations to achieve a minimal conflict between the first and second signatures.

20 Claims, 5 Drawing Sheets

(56) References Cited

U.S. PATENT DOCUMENTS

| | | | |
|---|---|---|---|
| 8,405,522 B2* | 3/2013 | Shaffer | G08G 1/167 340/4.12 |
| 8,942,892 B2 | 1/2015 | Veen et al. | |
| 9,202,351 B2* | 12/2015 | Levesque | G06F 3/016 |
| 9,639,156 B2 | 5/2017 | Iorgulescu et al. | |
| 9,659,468 B2* | 5/2017 | Cruz-Hernandez | G08B 6/00 |
| 2003/0055546 A1 | 3/2003 | Demerly et al. | |
| 2009/0167509 A1 | 7/2009 | Fadell et al. | |
| 2009/0167677 A1 | 7/2009 | Kruse et al. | |
| 2009/0259359 A1 | 10/2009 | Whitton et al. | |
| 2009/0305744 A1 | 12/2009 | Ullrich | |
| 2012/0229400 A1 | 9/2012 | Birnbaum et al. | |
| 2012/0229401 A1 | 9/2012 | Birnbaum et al. | |
| 2012/0249313 A1 | 10/2012 | Valfridsson et al. | |
| 2013/0078976 A1 | 3/2013 | Naftolin | |
| 2013/0169423 A1 | 7/2013 | Iorgulescu et al. | |
| 2014/0052401 A1 | 2/2014 | Riley et al. | |
| 2014/0198068 A1 | 7/2014 | Lee et al. | |
| 2014/0245620 A1 | 9/2014 | Fankhauser et al. | |
| 2015/0014004 A1 | 1/2015 | Schubert et al. | |
| 2015/0350146 A1 | 12/2015 | Cary et al. | |
| 2016/0019767 A1 | 1/2016 | Ebe | |
| 2016/0375346 A1 | 12/2016 | Czaja et al. | |
| 2017/0076564 A1 | 3/2017 | Cruz-Hernandez et al. | |

FOREIGN PATENT DOCUMENTS

| | | |
|---|---|---|
| EP | 2778845 | 9/2014 |
| EP | 2778851 | 9/2014 |

OTHER PUBLICATIONS

European Search Report issued in EP application No. 14 15 9278, dated Jun. 5, 2014.
Extended European Search Report issued in EP 16192812.2, dated Mar. 8, 2017.
Extended European Search Report issued in EP Application No. 16166542.7, dated Aug. 19, 2016.
Non-Final Office Action issued in U.S. Appl. No. 15/486,583, dated Oct. 26, 2017.
Advisory Action issued in co-pending U.S. Appl. No. 15/486,583.
Communication pursuant to Article 94(3) EPC issued in European Application No. 16192812.2, dated Mar. 8, 2019.

* cited by examiner

HAPTIC EFFECTS CONFLICT AVOIDANCE

This application is a continuation of U.S. application Ser. No. 15/841,227, filed Dec. 13, 2017, which is a continuation of U.S. application Ser. No. 15/049,745, filed Feb. 22, 2016, which issued as U.S. Pat. No. 9,881,467 on Jan. 30, 2018, the contents of which are incorporated by reference herein in its entirety.

FIELD

One embodiment is directed generally to haptic effects. More particularly, an embodiment is directed to multiple occurring haptic effects.

BACKGROUND INFORMATION

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect that is perceived by the user.

Portable/mobile electronic devices, such as mobile phones, smartphones, camera phones, cameras, personal digital assistants ("PDA"s), etc., typically include output mechanisms to alert the user of certain events that occur with respect to the devices. For example, a cell phone normally includes a speaker for audibly notifying the user of an incoming telephone call event. In some mobile devices, kinesthetic feedback (such as active and resistive force feedback) and/or tactile feedback (such as vibration, texture, and heat) are also provided to the user.

SUMMARY

One embodiment includes using a haptic enabled device that can generate haptic effects associated with a first signature. The embodiment also includes detecting another source of haptic effects and determining a second signature is associated with the source's haptic effects. A preferred haptic notification is determined for either the haptic enabled device or the source, where either the first or second signature is modified such that the first and second signatures minimally conflict.

DETAILED DESCRIPTION

A user can be subjected to multiple sources of haptic effects. A source of haptic effects could include a haptically enabled device that is specifically designed to generate haptic effects. In addition, there are other sources of haptic effects that are not specifically designed to generate haptic effects. For example, a wristband on a smart watch that produces a clicking effect when the user's wrist is moved. In this case the user can perceive two set of haptic effects, one from the wristband and one from the smart watch. If the clicking produced by the wristband is similar to the haptic effect of the haptically enabled device, then confusion can result in the user knowing the source of the haptic effect.

In another example, if the user is traveling by automobile with a warning system that vibrates the steering wheel or seat in the case of an approaching road hazard or navigational feedback, the user could experience yet another haptic notification. If each haptic effect was a vibration at approximately 175 Hz., the user could potentially sense vibrations at the same frequency from the steering wheel, seat, smart phone and fitness tracker and not be able to distinguish between each of the notifications, causing a haptic effect conflict.

One embodiment resolves haptic effect notification conflicts where a person is using a haptic enabled device (e.g., a smart phone). Given that there is another source of haptic effects (e.g., a wristband that generates haptic effects or a haptically enabled fitness tracker), the first step is to detect that the other source exists. Next, the haptic effects signature of the other source must be determined (e.g., type of effect, frequency and duration). For example, the other source has a haptic signature of vibration at 175 Hz in 1 second intervals for 3 seconds. Next, the signature of the haptic effect of the other source should minimally conflict with the user's haptic enabled device. Therefore, for example, the smart phone's haptic notification could still be a vibration but modified to be at a lower frequency (e.g., 30 Hz), that is continuous for five seconds. Hence, the signature of the haptic effects of the smart phone will minimally conflict with the signature of the other source.

In an embodiment, a haptic notification can be viewed as the equivalent of a melody, such as a sequence of vibration pulses at different frequencies or intensities. For example, if a source of haptic effects produces a low intensity vibration at 100 Hz, and the haptic enabled device also uses an actuator at 100 Hz, a modified haptic notification could still be produced at 100 Hz but in a sequence of pulses (e.g., five 1 second pulses at 100 Hz) with increasing or decreasing amplitude. Further, if the haptic effects source produces a sequence of multi-frequency vibrations, (e.g., 50, 150 and 75 Hz) then a haptic enabled device could differentiate its notification by using a different type of sequence (e.g., 50, 50, 150 and 150 Hz).

Figure 1:
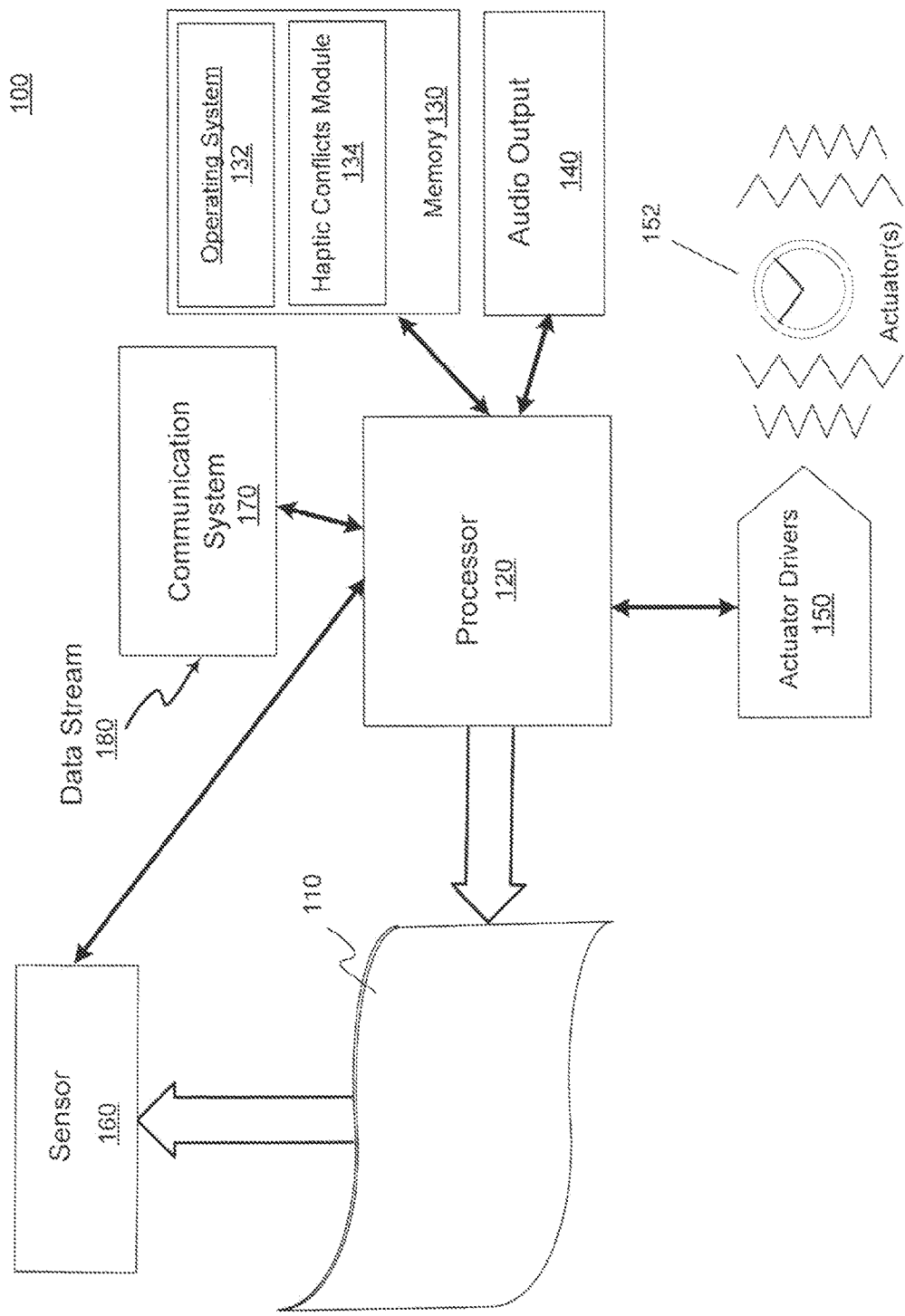
FIG. 1 is a diagram of a haptic-enabled system in accordance with an embodiment of the present invention.

FIG. 1 is a block diagram of a haptic system 100 in accordance with an embodiment of the present invention. System 100 includes a haptic device 110. Haptic device 110 also includes a processor 120, an actuator driver 150 including actuator 152, a memory 130 that contains an operating system 132, a haptic conflicts module 134, an audio output 140, a sensor 160 and a communication system 170. Further, system 100 receives and transmits content and data via a data stream 180.

Communication system 170 can also include a cloud based communication and server network. As such, communication system 170 may include one or more cloud based architectures including one or more networks, such as a local area network ("LAN"), a wide area network ("WAN"), the Internet or a combination thereof. The connection of the components to a cloud based architecture can be wired, wireless, or a combination of wired and wireless connections. Cloud connections can also connect to a server and storage, and can be any type computer and storage system. Public profiles of each device and/or users of each device can be stored in the cloud and made publicly available to other users and/or devices.

Haptic device 110 can also include a display screen (not shown) that can also be touch sensitive. Therefore, in addition to displaying images, the screen is capable of recognizing touches, such as those provided by a user, and may also recognize any of the position, pressure magnitude, and duration of touches on the surface. The data corresponding to the touches is sent to processor 120, or another processor within system 100, and processor 120 interprets the touches and in response generates haptic effect signals. The touch surface may sense touches using any sensing technology, including capacitive sensing, resistive sensing, surface acoustic wave sensing, pressure sensing, optical sensing, etc. The touch surface may sense multi-touch contacts and may be capable of distinguishing multiple touches and the location of the touches that occur at the same time.

Haptic device 110 may contain other components that are not shown including, for example, a power source, I/O jacks, microphone, control buttons, camera, etc.

System 100 may include memory 130 for storing information and instructions for execution by processor 120. Memory 130 may contain various components for retrieving, presenting, modifying, and storing data. For example, memory 130 may store software modules that provide functionality when executed by processor 120.

Haptic device 110 includes processor 120 that is coupled to memory 130. Memory 130 may contain various components for retrieving, presenting, modifying, and storing data. For example, memory 130 may store software modules that provide functionality when executed by processor 120. Memory 130 can store an operating system in addition to haptic effects instructions. Haptic effects instructions are also referred to as a "haptic track" and provide a stream of commands to processor 120 that control actuator driver 150 to produce the desired haptic effects. These effects include the type of effect (e.g., vibration, deformation, shaking, etc.), and other parameters such as frequency, duration, strength, on/off, pervasiveness, themes, preferred haptic actuator, and preferred info encoding. Actuator driver 150 is coupled to one or more actuators 152. Processor 120 receives content through data stream 180 and can include data, instructions, video and/or audio content. Videos, games and haptically-enabled applications typically include a set of default configuration settings that initialize the above referenced parameters. Non-transitory memory 130 may include a variety of computer-readable medium that may be accessed by processor 120. In the various embodiments, memory 130 may include volatile and nonvolatile medium, removable and non-removable medium. For example, memory 130 may include any combination of random access memory ("RAM"), dynamic RAM (DRAM), static RAM (SRAM), read only memory ("ROM"), flash memory, cache memory, and/or any other type of non-transitory computer-readable medium.

Processor 120 can decide what haptic effects are to be played and the order in which the effects are played based on configuration setting parameters. Low level configuration setting parameters such as streaming motor commands can also be used to determine a particular haptic effect. A haptic effect may be considered "dynamic" if it includes some variation of these parameters when the haptic effect is generated or a variation of these parameters based on a user's interaction.

Actuators 152 can include one or multiple actuators where such actuators include deformation and vibration type actuators, or where a deformation actuator could be used to deform and to vibrate. The actuators can include any type of motor, including without limitation an Eccentric Rotating Mass ("ERM"), a Linear Resonant Actuator vibration motor ("LRA"), a piezoelectric motor, or a solenoid actuator. In addition to or in place of actuator 152, system 100 may include other types of haptic output devices (not shown) that may be non-mechanical or vibrotactile haptics devices such as devices that generate electrostatic friction ("ESF"), ultrasonic surface friction ("USF"), devices that induce acoustic radiation pressure with an ultrasonic haptic transducer, devices that use a haptic substrate and a flexible or deformable surface or shape changing devices and that may be attached to a user's body, devices that provide projected haptic output such as a puff of air using an air jet, devices that provide electrical muscle stimulation, etc. Further, actuators 152 can utilize shape memory alloy ("SMA") wires to force haptic device 110 to bend along one or more axes (e.g., along the corners or to twist). Other technologies such as smart materials, strings pulled by motors, or arrays of moveable pins could also be used for actuation.

Actuator driver 150 with actuators 152 produce haptic effects that include various vibrations and shaking effects. Actuator driver 150 and actuators 152 can also be used to deform the shape of haptic device 110. Such deformation can occur in a single axis, two axes, or in three axes and can produce an extension, twisting or bending of haptic device 110 in one, two, or three dimensions.

Processor 120 may be any type of general purpose processor, or could be a processor specifically designed to provide haptic effects, such as an application-specific integrated circuit ("ASIC"). Processor 120 may be the same processor that operates the entire system 100, or may be a separate processor. Processor 120 fetches haptic effects instructions from memory 130 that direct processor 120 as to which particular haptic effects are to be produced by actuator driver 150, including the characteristics of the effects. Haptic effects instructions can be pre-loaded and resident in memory, or they can be loaded from an integrated port, (e.g., a Universal Serial Bus ("USB")), or downloaded via data stream 180. Processor 120 can also generate haptic effects instructions based on content received in data stream 180. Data stream 180 could contain the actual haptic effects instructions that would then be stored in memory 130, or data stream 180 could contain audio and/or visual content from which processor 120 would construct haptic effects instructions in real time, or for storage in memory 130 for later playback. System 100, in embodiments that transmit and/or receive data via data stream 180, further include communication system 170, such as a Wi-Fi subsystem or a cellular link.

Memory 130 can be any type of storage device or computer-readable medium, such as random access memory ("RAM") or read-only memory ("ROM") or any other type of computer-readable memory. Memory 130 stores instructions that are executed by processor 120 including operating system 132 Memory 130 also includes haptic conflicts module 134 that when executed by processor 120, determined conflicts between haptic effects, modifies haptic configuration settings that control the characteristics of generated haptic effects, and all other functionality discloses herein. Haptic conflicts module 134 can also communicate through communication system 170 to access other haptically enabled devices, or other systems such as external databases. Memory 130 may also be located internal to processor 120, or any combination of internal and external memory.

Processor 120 outputs the command and control signals to actuator driver 150, which includes electronic components and circuitry used to supply actuator 152 with the required electrical current and voltage (e.g., "motor signals") to cause the desired haptic effects. As previously mentioned, system 100 may include more than one actuator 152, and each actuator may include a separate drive circuit (not shown), all coupled to processor 120.

System 100 may include a variety of sensors, such as sensor 160, for sensing interactions with haptic device 110. Sensor 160 can consist of, among others: strain gauge sensors to measure the deformation magnitude during interactions, force sensing resistor ("FSR") sensors to measure the force/stress applied to the haptic device, multi-touch touch sensors to detect the location of single or multiple touch inputs in a touch-enabled display, multi-touch pressure sensors to measure the pressure applied under each touch location, temperature/humidity/atmospheric pressure sensors to capture environmental conditions. The sensors can also include an accelerometer/gyroscope/magnetometer to characterize the motion, velocity, acceleration and orientation of the display, a microphone to capture a user's voice command or environmental audio information including sounds from haptic effects occurring naturally or by haptic-enabled devices, and wireless transmitters to receive/transmit information from/to other devices wirelessly. The data corresponding to sensor 160 is sent to processor 120, or another processor within system 100, and processor 120 interprets the sensor data and in response can generate haptic effect signals, generate or modify haptic configuration settings, produce feedback, audio responses, and visual images.

In addition to the actuators discussed above, system 100 may include a variety of actuators for providing vibrotactile or kinesthetic feedback including flexible, semi-rigid, or rigid actuators, including Electro Active Polymer ("EAP") actuators, smart fluids actuators, rheological fluidic actuators, Macro-Fiber Composite ("MFC") actuators, Shape Memory Alloy ("SMA") actuators, piezo actuators, and Micro-Electro-Mechanical System ("MEMS") actuators.

System 100 may be a handheld device, such a cellular telephone, personal digital assistant ("PDA"), smartphone, computer tablet, gaming console, vehicle based interface, etc., or may be any other type of device that includes a haptic effect system with one or more actuators. The user interface may be a touch sensitive surface, or can be any other type of user interface such as a microphone, camera, etc. In embodiments with more than one actuator, each actuator that has rotational capability may have a different rotational capability in order to create a wide range of haptic effects on the device, for example each actuator can be controlled individually; also some rotational actuators have their axis of rotation at an angle to the axis of rotation of other rotational actuators. Likewise, in embodiments with multiple actuators with other capabilities, each actuator can be controlled individually to exhibit a wide range of haptic effects on the device. For example, multiple actuators could be used to independently deform each of the four corners of haptic device 110, each at a different rate and degree of deformation.

Figure 2:
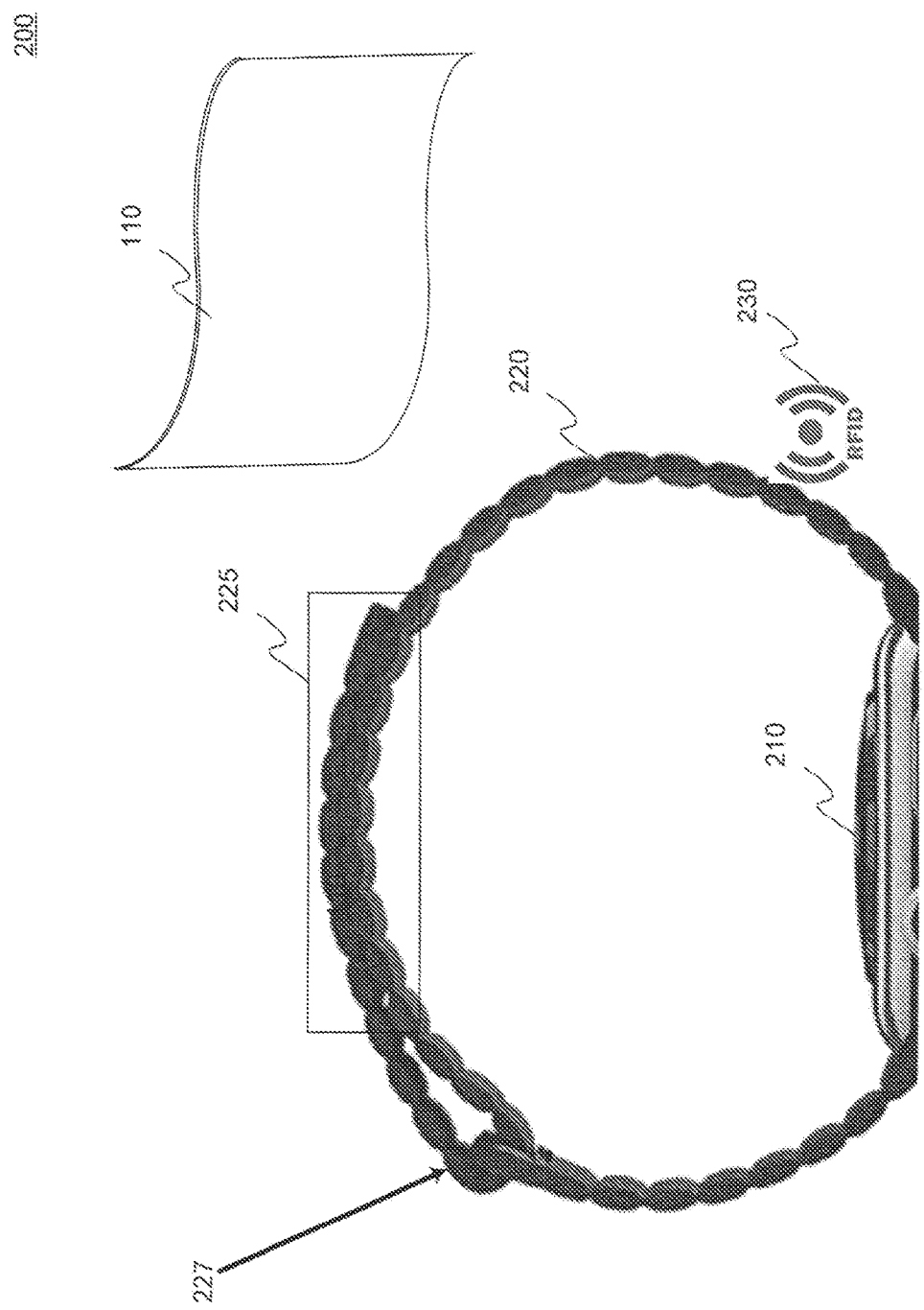
FIG. 2 illustrates a natural haptic, according to an embodiment.

FIG. 2 is an illustration of a possible "naturally occurring" or "natural" haptic effect. Natural haptic effects are produced by natural haptic sources such as objects or phenomena that are not designed to purposely produce haptic effects, according to an embodiment. For example, watch 200 represents a wristwatch that includes a watch body 210 and an attached wristband 220, according to an embodiment. In this example wristband 220 is made up of a material that contains magnetic links/elements. Because of the magnetic attraction, area 225 represents an area where the band is attracted to itself and thus holds watch 200 on to the user's wrist. However, in this design it is possible, due to the movement of the user's arm that a clicking sensation could be produced where the band wraps around the clasp at point 227.

The natural haptic effect produced by wristband 220 of watch 200 could be confused with a haptic effect produced by a haptically enabled device, such as a smart phone, haptic device 110 or watch 200. Multiple approaches can be used to avoid the confusion between haptic effects produced naturally versus from a haptic enabled device. In an embodiment, the source of the haptic effects is detected and then identified. For example, wristband 220 could include a Radio Frequency IDentification ("RFID") 230 module. RFID 230 could be encoded to include information identifying wristband 220 as a magnetic leather wristband manufactured by XYZ Corporation. Therefore, haptic device 110, equipped with an RFID reader, could read the information contained in the RFID and use that information to identify wristband 220. Once the type of wristband, or any other object that could produce a haptic effect, is identified a database could be constructed that contains listings of known haptic effects information associated with each object. For example, wristband 220 from XYZ Corporation is known to produce low frequency clicking sensations. Once the haptic characteristics of wristband 220 are known, which are also referred to as the haptic signature, or just the signature of wristband 220, then the haptic characteristics of a haptic device 110 can be modified so that the characteristics are sufficiently different from the signature of wristband 220. In other words, once the signature of wristband 220 is ascertained, then the signature of haptic device 110 can be modified such that the conflict between the signatures is minimized.

In another embodiment, watch 200 may not have RFID 230 embedded into wristband 220. In that case, a haptic enabled device cannot communicate with the object producing a haptic effect, but could detect the haptic effects produced by the object (e.g., wristband 220). Such detection can be accomplished through the use of internal sensor 160 that could include a microphone, accelerometer, and/or gyroscope, etc., and generate an associated signature for wristband 220. As an example, Alice has a smart watch that produces a satisfying thump as she receives an email message. However, when she changes the wristband on the smart watch to a different style band, the new band naturally thumps while her wrist moves. Because of the ability of the smart watch to detect haptic sensations or to detect the identity of the new wristband, the haptic notifications produced by the smart watch are modified to a higher frequency buzz. With the change of haptic signature produced by the smart watch, there is no confusion between the notification and the naturally occurring thumping of the new wristband.

The detection of haptic effects includes vibrations and other sensations encountered in daily life. When any type of pattern of haptic effects are detected, a haptic device (e.g., haptic device 110 or 310), can modify its haptic notifications in response to the detected haptic patterns. For example, Curtis wears a haptic fitness tracker on his wrist. The tracker normally produces a low frequency haptic vibration when he needs to take a break. However, while Curtis is cycling, the tracker is smart enough to detect the vibrations that he is feeling through the handles of the bicycle. In response, the tracker modifies the haptic notification to produce a higher frequency haptic effect that is not mistaken for the vibrations of the road.

Haptic detection of human movement can also be used to modify haptic notifications. For example, Dan used to often think that his phone was buzzing when instead the vibrations were due to naturally occurring vibrations in the muscles in his leg. His new phone however adapts to the vibrations that the muscles in his thighs produce and uses a different type of haptic effect when it is held in his pocket (e.g., different frequency than the natural vibrations of the muscles).

In addition to haptic notifications, conflict avoidance can also be applied to haptic tracks, for example in a video. As mentioned above, haptic effects instructions are also referred to as a "haptic track" and provide a stream of commands to a processor that controls actuators to produce a desired haptic effect. For example, a video could be distributed with multiple haptic tracks. Therefore, for example, if someone is watching a video on a train, the system could detect the vibrations caused by the train and play the haptic track that is the most different from the train vibrations. Similarly, a track could consist of a modulation of a carrier frequency (e.g., the encoding of the amplitude over time of a vibration, for example at 120 Hz). The carrier frequency could then be adjusted to avoid the frequency of the environment (e.g., at 75 Hz given that the frequency of the train vibrations is at 120 Hz).

Figure 3A:
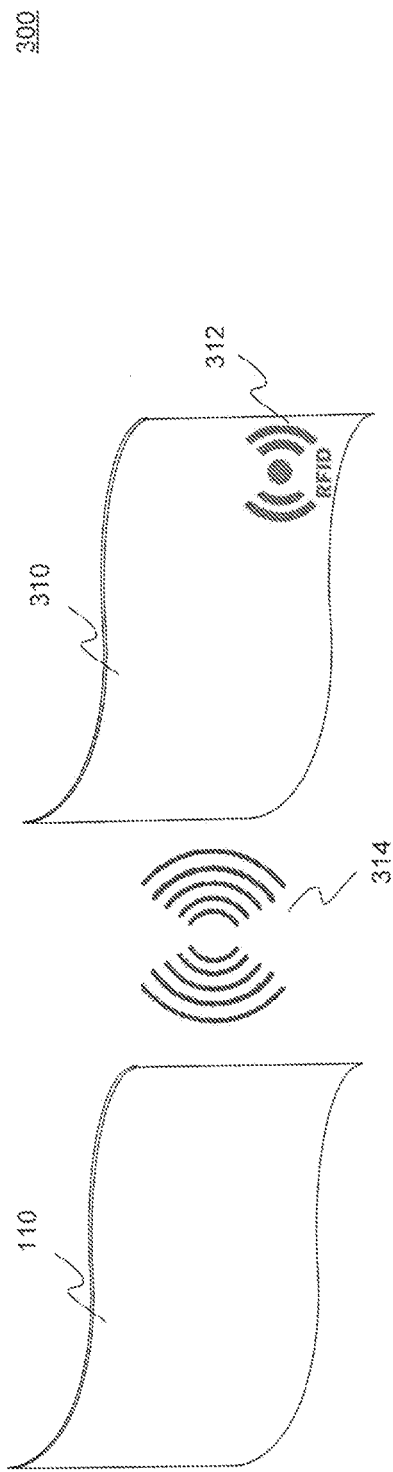
FIGS. 3A and 3B illustrate multiple haptic output devices and natural haptic devices in an environment, according to an embodiment.

In addition to communicating with an object that produces natural haptic effects as discussed in FIG. 2, haptic device 110 can also communicate and negotiate with another haptic device. For example, FIG. 3A illustrates two haptic devices, 110 and 310, according to an embodiment. For example, haptic device 110 could produce a haptic notification with a signature consisting of a low frequency chirp that has a duration of one second. For sake of argument, haptic device 310 could be programmed to produce the same haptic effect, a low frequency chirp with a duration of one second. In this scenario the haptic signature of haptic device 110 is in total conflict with the haptic signature of haptic device 310.

In an embodiment, to minimize the conflicting haptic signatures between haptic devices 110 and 310, there are a set of communications between the haptic devices. For example, communication system 170 (not shown) in haptic device 110 could communicate with haptic device 310 wirelessly through signal 314 (e.g., radio frequency ("RF"), infra-red ("IR"), Wi-Fi, Bluetooth, RFID, etc.). Haptic device 110 could then negotiate with haptic device 310 to either change the haptic signature of haptic device 310 to minimize conflicts with the haptic signature of haptic device 110, or in the alternative to change the haptic signature of haptic device 110. In an embodiment, rather than negotiating between the two haptic devices, haptic device 110 would, through signal 314, ascertain the identity of haptic device 310, and through the use of a database or look-up table would identify the haptic signature associated with haptic device 310 and then adjust the haptic signature of haptic device 110 accordingly. The database or look-up table could also be pre-programmed in haptic device 110, thus negating the necessity of communicating with an external database.

As an example of wireless communication, Bob wears a smart watch and a smart ring. Both produce haptic feedback that is very similar by default. When Bob wears both devices, both are smart enough to communicate with one another and change their notifications so that they feel different and are not mistaken for one another as easily.

Figure 3B:
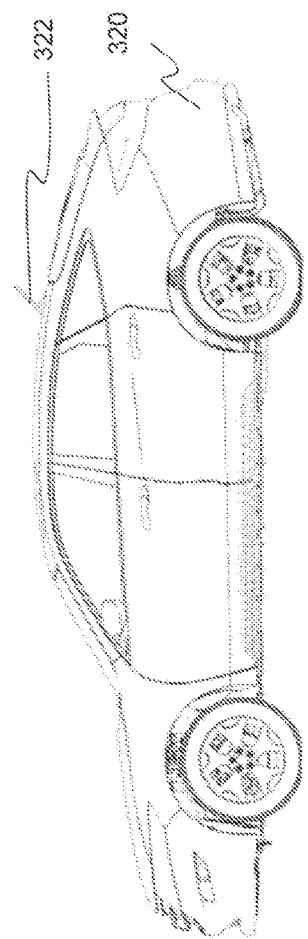

In an embodiment, an object that can produce haptic effects, for example a car 320, could also contain a beacon 322, as shown in FIG. 3B. Therefore, when a person is entering car 320, beacon 322 would identify to haptic device 110 carried by the user that the object the user is about to enter is a vehicle. Beacon 322 could also transmit the haptic signature typically encountered in the car (e.g., low frequency rumbling from the interaction between the tires and the road). In this scenario since the haptic signature of the vehicle cannot be changed, haptic device 110 would modify its haptic signature to minimize conflict with the vehicle's haptic signature. In the alternative, instead of beacon 322 transmitting a haptic signature, it could just transmit an identification code of the vehicle that haptic device 110 would use to look up a corresponding haptic signature. Rather than a beacon, detection of a haptic source could also be ascertained through the use of geo-positioning or indoor positioning. For example, through indoor positioning it could be determined that a person is entering an elevator. As it is known that elevators can produce some low frequency vibrations, haptic device 110 could reconfigure itself to avoid the use of a low frequency vibration notification until the user has exited the elevator.

Figure 4:
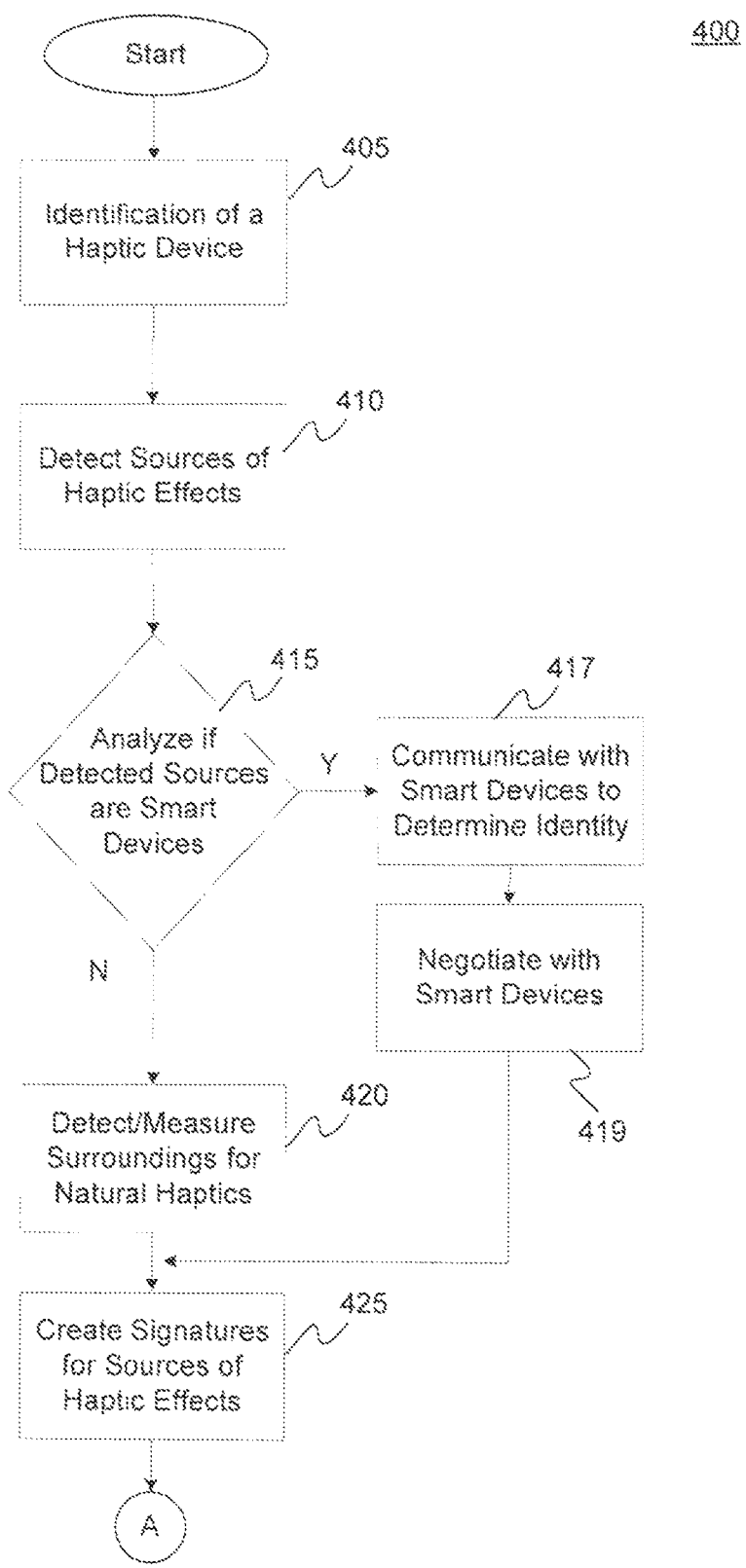
FIG. 4 is a method flow diagram illustrating the process to identify sources of haptic effects and create associated signatures, according to an embodiment.

FIG. 4 is a flow diagram illustrating functionality 400 for detecting, measuring and creating signatures for sources of haptic effects, according to an embodiment. In some instances, the functionality of the flow diagram of FIG. 4 (and FIG. 5 below) may be implemented by software stored in memory or other computer readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

Functionality 400 starts at 405 with the identification of a haptic output device being used by a user, or as illustrated in FIG. 1, a user's haptic device 110. The determination of the current configuration of the haptic device is determined so that the device's haptic effects can be determined (e.g., for haptic device 110). The haptic effects of haptic device 110 can include both the known haptic effects that haptic device 110 is capable of producing, plus any additional natural haptic effects. For example, the device could detect which bracelet is being used and then use a look-up table to determine what natural haptics this bracelet produces. The configuration could be detected based on an RFID tag, visual identification from a camera, or by having the user manually enter the change in configuration.

Haptic device 110 is capable of producing haptic effects and can also include such features as global positioning, indoor positioning technology, microphone, accelerometer and communications capabilities such as Bluetooth and RFID detection. These features can be used in the detecting, measuring and creation of haptic signatures as will be further discussed. Haptic device 110 is capable of producing haptic notifications that indicate some type of event. Haptic notifications can take the form of vibrations and deformations of varying intensities, duration, frequency and amplitude.

410 is directed to the detection of a source of haptic effects. One of the goals of functionality 400 is to detect the presence of other sources of haptic effects so that the characteristics of the other sources of haptic effects can be compared to those effects produced by the user's haptic device 110. Detection of sources of haptic effects can be accomplished in a number of ways. For example, if haptic device 110 detects the presence of a haptic effect, possibly through the detection of a vibration through the use of its internal accelerometer, or through the detection of a buzzing sound using its microphone, haptic device 110 can attempt to communicate with the source of the detected haptic effects. Thus, haptic device 110 could attempt to communicate using a wireless communications protocol as Bluetooth, RF, IR or RFID detection. However, if the source of the haptic effects is a natural haptic effect (e.g., a haptic effect produced by an object or phenomena that was not designed to purposely produce haptic effects), such as the elevator example previously discussed, then it may not be possible to communicate with the source of that natural haptic effect.

At 415 the attempt is made to determine more information about the source of the haptic effects. As discussed above, haptic device 110 can attempt to communicate with the source of the haptic effects. If the source is a "smart" device with communication capabilities then the functionality is directed to 417 in which the attempt is made to communicate with the source to determine the source's identity. If the identity of the source can be identified, then haptic device 110, through pre-programmed data or the ability to communicate with a database, can determine the haptic characteristics that can be produced by the source. Further, haptic device 110 can determine if the smart source is capable of modifying the characteristics of its produced haptic effects. If the smart device is capable of modifying its haptic signature, then haptic device 110 and the smart device can negotiate to determine the characteristics of each one's haptic output. In other words, the negotiation would result in generating haptic signatures for each device with the minimal conflict.

However, if the detected source of the haptic effects is not a smart device, then event 415 proceeds to event 420. If haptic device 110 cannot communicate with the source of the haptic effects, then haptic device 110 must detect and measure the haptic effects being produced by the source. In this case since the identity of the source cannot be determined by communications with the source, the resulting haptic effects must be measured directly by haptic device 110 using its own detection components (e.g., camera, microphone, accelerometer, laser vibrometer). For example, visual identification may be possible through the use of a camera and an image database.

In addition, any haptic effects (e.g., vibrations), that significantly differ from the background noise are recorded and stored in a database for later analysis. For example, a recording could be triggered by a vibration that exceeds a minimal threshold and continue until the vibration returns to below this threshold for more than a predetermined time period (e.g., one second). Haptic device 110 can periodically analyze the recorded patterns and any patterns that are deemed similar can be grouped together and their frequency can be noted. Natural haptic patterns that occur at more than a certain frequency can then be marked as haptic patterns to avoid. The similarity of different patterns could be established by comparing the key frequency components of the different patterns, their durations or any other method known in the art.

Figure 5:
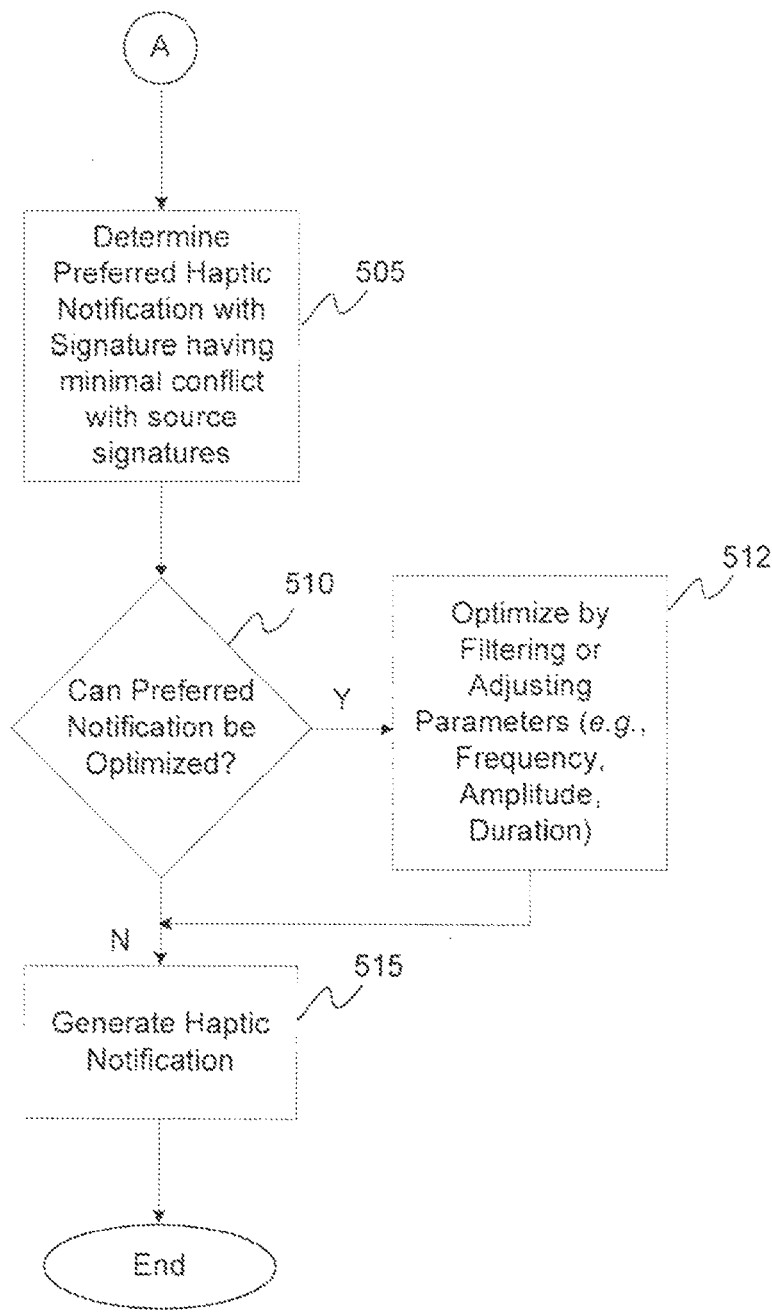
FIG. 5 is a method flow diagram to determine, create and optimize a preferred haptic notification with a signature that has minimal conflict with the source signatures, according to an embodiment.

Once the haptic effects from the detected source and the user's own haptic device are known, then each set of haptic characteristics are classified as its haptic signature as is done at 425 which indicates to proceed to point "A" that is illustrated in FIG. 5 where the goal is to generate a preferred set of haptic configurations to minimize conflict between the source signature and the haptic device signature.

FIG. 5 continues the flow diagram starting in FIG. 4. At 505 haptic device 110 now knows what haptic effects are to be expected from the source (i.e., the source's haptic signature). Haptic device 110 also knows its own haptic signature, which includes both natural haptics and the haptic effects it is designed to produce. At 505 the goal is to minimize the conflicts between the signatures. A haptic signature can be analyzed as a set of characteristics that can be controlled by haptic device 110. For example, the following can be attributes that can be controlled and adjusted:

Frequency;
Duration;
Rhythm/repetition;
Melody (sequence of tones);
Intensity of haptic patterns; and
Haptic actuators used.

Thus, haptic device 110 can compare the above characteristics of each signature and adjust where feasible. Such modifications can be made only at haptic device 110, at the source, if possible, or both. The result is a preferred haptic notification with minimal conflicts between signatures.

Further, haptic device 110 could be pre-programmed with different haptic themes depending on the configuration being used. For example, each bracelet associated with haptic device 110 could cause haptic device 110 to produce different haptic effects. To avoid confusion, the haptic theme could also be based on all bracelets owned so that no change in haptic feedback is necessary when changing the bracelet.

Moving to event 510, in some instances it is possible to optimize the preferred notification. For example, at 512 haptic device 110 could automatically design a filter based on the haptic effects of the source. The filter could be applied to the haptic effect generation signal such that any components similar to the source haptic effects are eliminated or attenuated. However, the resulting signal must have sufficient attributes to be perceptible by the user.

At 515, the preferred notification parameters, whether filtered or not, are used to generate a preferred haptic notification with a haptic signature that has minimal conflicts with the haptic signature of the source.

As disclosed above, a user has a haptic enabled device capable of producing haptic effects with certain characteristics referred to as a haptic signature. If the user is in proximity with another source of haptic effects with a similar haptic signature as compared to the user's haptic enabled device, it is possible that the user will have difficulty discerning between the haptic effects of the haptic enabled device and the other source. Therefore, the other source of haptic effects is detected and its haptic signature is determined. To avoid confusion the haptic signature of either the haptic enabled device or the source is modified so that the signatures of the haptic enabled device minimally conflicts with the source signature.

The analysis, determination, optimization and generation as described in FIGS. 4 and 5 can be accomplished either at the haptic device level, at the cloud computing level, or using a combination of both. The use of cloud computing includes computation and storage wherein shared resources, data and information are provided amongst servers and other devices on-demand. Further, various profiles can be defined that determine how and which resources are to be used at the cloud and haptic device level for the desired computational tasks as described above.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A method of reducing haptic effect conflicts performed by a haptic enabled device configured to generate a first haptic effect, the method comprising:
   determining a first signature associated with the first haptic effect, the first signature being defined by a first haptic characteristic, the first haptic characteristic including at least one of frequency, duration, rhythm, melody, intensity, and actuators used to produce the first haptic effect;
   detecting a presence of a second haptic effect;
   determining a second signature associated with the second haptic effect, the second signature being defined by a second haptic characteristic, the second haptic characteristic including at least one of frequency, duration, rhythm, melody, intensity, and actuators used to produce the second haptic effect;
   identifying a conflict between the first signature and the second signature according to a comparison between the first haptic characteristic and the second haptic characteristic; and
   modifying the first haptic effect to reduce the conflict.

2. The method of claim 1, wherein identifying the conflict between the first signature and the second signature includes identifying a similarity between the first haptic characteristic and the second haptic characteristic.

3. The method of claim 1, wherein the first signature is defined by a first plurality of haptic characteristics selected from frequency, duration, rhythm, melody, intensity, and actuator(s) used to produce the first haptic effect, the first plurality of haptic characteristics including the first haptic characteristic, and
   the second signature is defined by a second plurality of haptic characteristics selected from frequency, duration, rhythm, melody, intensity, and actuator(s) used to produce the second haptic effect, the second plurality of haptic characteristics including the second haptic characteristic.

4. The method of claim 3, wherein identifying the conflict between the first signature and the second signature further includes a comparison between the first plurality of haptic characteristics and the second plurality of haptic characteristics.

5. The method of claim 1, further comprising:
   recording the second haptic effect as a recorded haptic effect, wherein recording the second haptic effect is triggered by a vibration that exceeds a minimal threshold and determining the second signature is performed according to the recorded haptic effect.

6. The method of claim 1, wherein modifying the first haptic effect includes modifying the first haptic characteristic of the first haptic effect.

7. The method of claim 1, wherein modifying the first haptic effect includes modifying a haptic characteristic of the first haptic effect different from the first haptic characteristic.

8. The method of claim 1, wherein modifying the first haptic effect further includes
   generating a filter according to similarities between haptic characteristics of the first haptic effect and haptic characteristics of the second haptic effect, and
   applying the filter to the first haptic effect such that the haptic characteristics of the first haptic effect that are similar to the haptic characteristics of the second haptic effect are attenuated.

9. The method of claim 1, wherein the first haptic characteristic is a frequency of the first haptic effect and the second haptic characteristic is a frequency of the second haptic effect, and wherein modifying the first haptic effect includes altering the frequency of the first haptic effect.

10. The method of claim 1, wherein the first haptic characteristic is a frequency of the first haptic effect and the second haptic characteristic is a frequency of the second haptic effect, and wherein modifying the first haptic effect includes modifying a rhythm of the first haptic effect.

11. A haptic enabled device configured to generate a first haptic effect, comprising:
    at least one actuator configured to output the first haptic effect, the first haptic effect being associated with a first signature defined by a first haptic characteristic, the first haptic characteristic including at least one of frequency, duration, rhythm, melody, intensity, and actuator(s) used to produce the first haptic effect;
    at least one sensor configured to detect a presence of a second haptic effect; and
    a processor configured to
       determine a second signature associated with the second haptic effect, the second signature being defined by a second haptic characteristic, the second haptic characteristic including at least one of frequency, duration, rhythm, melody, intensity, and actuator(s) used to produce the second haptic effect,
       identify a conflict between the first signature and the second signature according to a comparison between the first haptic characteristic and the second haptic characteristic, and
       modify the first haptic effect to reduce the conflict.

12. The device of claim 11, wherein the processor is further configured to identify the conflict between the first signature and the second signature by identifying a similarity between the first haptic characteristic and the second haptic characteristic.

13. The device of claim 11, wherein the first signature is defined by a first plurality of haptic characteristics selected from frequency, duration, rhythm, melody, intensity, and actuators used to produce the first haptic effect, the first plurality of haptic characteristics including the first haptic characteristic, and
    the second signature is defined by a second plurality of haptic characteristics selected from frequency, duration, rhythm, melody, intensity, and actuator(s) used to produce the second haptic effect, the second plurality including the second haptic characteristic.

14. The device of claim 13, wherein the processor is further configured to identify the conflict between the first signature and the second signature by comparing the first plurality of haptic characteristics and the second plurality of haptic characteristics.

15. The device of claim 11, wherein the sensor is further configured to cause recording of the second haptic effect as a recorded haptic effect, the recording of the second haptic effect is triggered by a vibration of the second haptic effect that exceeds a minimal threshold, and the processor is further configured to determine the second signature according to the recorded haptic effect.

16. The device of claim 11, wherein the processor is further configured to modify the first haptic effect by modifying the first haptic characteristic of the first haptic effect.

17. The device of claim 11, wherein the processor is further configured to modify the first haptic effect by modifying a haptic characteristic of the first haptic effect different from the first haptic characteristic.

18. The device of claim 11, wherein the processor is further configured to generate a filter according to similarities between haptic characteristics of the first haptic effect and haptic characteristics of the second haptic effect, and apply the filter to the first haptic effect such that the haptic characteristics of the first haptic effect that are similar to the haptic characteristics of the second haptic effect are attenuated.

19. The device of claim 11, wherein the first haptic characteristic is a frequency of the first haptic effect and the second haptic characteristic is a frequency of the second haptic effect, and wherein modifying the first haptic effect includes altering the frequency of the first haptic effect.

20. The device of claim 12, wherein the first haptic characteristic is a frequency of the first haptic effect and the second haptic characteristic is a frequency of the second haptic effect, and wherein modifying the first haptic effect includes modifying at least one of a rhythm and a melody of the first haptic effect.

* * * * *